Patented Dec. 5, 1922.

1,437,394

UNITED STATES PATENT OFFICE.

RALPH L. BROWN, OF PITTSBURGH, PENNSYLVANIA, ASSIGNOR TO THE KOPPERS COMPANY, OF PITTSBURGH, PENNSYLVANIA, A CORPORATION OF PENNSYLVANIA.

PURIFICATION OF PHENOL-CONTAMINATED LIQUORS.

No Drawing. Application filed April 30, 1920. Serial No. 377,953.

*To all whom it may concern:*

Be it known that I, RALPH L. BROWN, a citizen of the United States, residing at Pittsburgh, in the county of Allegheny and State of Pennsylvania, have invented a new and useful Improvement in the Purification of Phenol-Contaminated Liquors, of which the following is a full, clear, and exact description.

The present invention relates to the purification of phenol contaminated liquors and, particularly to the purification of waste ammonia still liquor from the gas and by-product coke plants. This liquor contains among other impurities phenoloid bodies which prohibit the discharge of the liquor into water courses, as even minute traces of the phenol renders water unfit for drinking or domestic purposes.

It has been found that it is possible to destroy the phenol by the action of certain phenol destroying micro-organisms which are apparently of the bacterial type. These micro-organisms apparently oxidize the phenol into other and innocuous substances.

The present invention relates particularly to the purification of phenol containing liquors by the action of these phenol destroying micro-organisms. One object of the invention is to purify the phenol contaminated liquors by passing the liquors through a filter, the material of which need not be removed from the filter bed. The process is preferably carried out so that the filtration is continuous. The process is carried out so that there is a replacement of the phenol destroying micro-organisms substantially offsetting their wastage.

The preferred process, as it has been determined by trials, will now be described. A filter bed is prepared containing humus material, preferably peat. The humus material is preferably mixed with some material, such as coke, which will keep it from packing and will permit free access of air to the humus material. The filter is arranged so that the air has free access to the filtering material. The air may be mechanically forced or drawn through the filter bed, if desired. In initially preparing the filter, it is inoculated with the aerobic bacteria by passing through it activated sludge obtained from the aeration tanks of sewage disposal plants. Instead of activated sludge other inoculating materials might be used, for example, barn yard manure has been used.

The still waste is then passed continuously through the filter bed. The still waste is passed through slowly so that the filter bed acts as a trickling filter. The ammonia still waste is diluted so that the phenol is not in sufficient concentration to have any considerable toxic action upon the bacteria in the filter. The undiluted still waste has a toxic effect upon the bacteria. The ordinary ammonia still waste from by-product coke plants is diluted so that the still waste constitutes preferably about 10 to 15% of the diluted liquor passed through the filter. Water may be used as the diluent but it is preferable to dilute the raw still waste with the effluent or previously purified liquor from the filter. The filter effluent contains nitrates which apparently assist in the oxidation of the phenols. In operating the filter about 10 to 15% of the effluent is discharged into the water course and the remaining 85 to 90% of the effluent is passed again through the filter, 10 to 15% of the raw still waste being added.

While a dilution of 10 to 15% raw still waste in the diluent is preferred, this proportion may apparently be varied from about 5 to 30%. The dilution should be such that the phenol concentration should be about one to two parts in ten thousand, and should apparently be less than three parts in ten thousand.

Tests have shown that in the dilutions above mentioned, one cubic yard of filter contents can take care of approximately ten to twenty gallons of crude still waste per twenty-four hours. It is found that with the dilutions and rates of flow above mentioned, the filter may be operated continuously. The humus material apparently serves to harbor and aid the growth of the bacteria. It is preferable to feed and stimulate the growth by treating the filter occasionally with activated sludge or barn yard manure. In the case of barn yard manure, the manure may be thrown on the top of the filter and the liquor passed through it to the filter bed. With the proper dilution and rate of flow of the liquor, the filter may be operated continuously since the reproduction and development of the phenol destroying micro-organisms is substantially in equilibrium with their wastage. If the wastage exceeds the reproduction, the dilution may be increased or the flow decreased, or the filter bed allowed to stand in situ for a short time to overcome the fatigue, and to cause the replacement of the micro-organisms to offset their wastage. The filter bed should be maintained at all times under conditions affording the growth of these phenol destroying micro-organisms. The temperature should be maintained from about 29 to 25 degrees Centigrade for the best results, and in the case of filtering ammonia still waste, the temperature may be regulated by cooling the still waste before it is mixed with the diluent on its way to the filter.

It is found that the bacteria will also largely oxidize the thiocyanates, as well as the phenols, in the waste ammonia still liquor, although the phenols are oxidized more readily.

In purifying the waste ammonia still liquor it is preferable to preliminarily filter or clarify it before passing it through the bacterial filter. This is preferably accomplished by allowing the still waste to stand in settling tanks and thereby settling out the solid substances. The liquid is then drawn off from the settling tank and given a preliminary filtration through some iron oxide containing inorganic material such, for example, as the spent blast furnace slag which results from the treatment of mine water by the process of the Heckman Patent No. 1,171,046 of February 8, 1916. This preliminary treatment substantially removes the solids, tarry material and sulphides which exist in the liquor, principally as calcium sulphide. The still waste may, if desired, be given a further preliminary treatment for the removal of cyanogen compounds.

While the present process has been developed and has been described with particular reference to the purification of the waste liquor from the ammonia stills of by-product coke plants, the process may be used for the purification of other phenol contaminated liquors.

The present process is not limited to the preferred mode of procedure above specifically set forth, but may be embodied in other processes within the scope of the following claims:

I claim:

1. The process of purifying phenol contaminated liquors, which consists in continuously passing the liquor at such dilution and rate of flow through a filter containing humus material holding phenol destroying mirco organisms as to continuously maintain an approximate balance between the micro-organic wastage and the micro organic reproduction in the filter, substantially as described.

2. The process of purifying waste ammonia still liquor, which consists in diluting the liquor and continuously passing the diluted liquor through a filter containing humus material holding phenol destroying micro-organisms, the dilution and rate of flow being such that a micro-organic reproduction is permitted which substantially offsets the micro-organic wastage, substantially as described.

3. The process of purifying phenol-contaminated liquors, which consists in passing the liquor at such dilution and rate of flow through a filter containing humus material holding aerobic phenol destroying micro-organisms and in which such micro-organisms have access to atmospheric oxygen, as to continuously maintain an approximate balance between the micro-organic wastage and the micro-organic reproduction in the filter, substantially as described.

4. The process of purifying phenol-contaminated liquors which consists in continuously passing the liquor through a filter bed of the trickling type composed of humus material which harbors aerobic phenol destroying micro-organisms and in which the air has access to the filtering material, and maintaining the dilution and rate of flow of the liquor through the filter so as to permit the micro-organic reproduction to substantially offset the micro-organic wastage, substantially as described.

5. The process of purifying phenol contaminated liquors which consists in preliminarily clarifying the liquor and then passing the clarified liquor at such dilution and rate of flow through a filter containing humus material holding phenol destroying micro-organisms as to maintain an approximate balance between the micro-organic wastage and the micro-organic reproduction in the filter, substantially as described.

6. The process of purifying phenol contaminated liquors, which consists in preliminarily treating the liquor with an iron oxide material and then passing the liquor at such dilution and rate of flow through a filter containing humus material holding phenol destroying micro-organisms as to maintain an approximate balance between the micro-organic wastage and the micro-organic reproduction in the filter, substantially as described.

7. In the process of purifying phenol contaminated liquors, which consists in passing the liquor at such dilution and rate of flow through a filter bed containing peat holding phenol destroying micro-organisms as to maintain an approximate balance between the micro-organic wastage and the micro-organic reproduction in the filter, substantially as described.

8. The process of purifying phenol contaminated liquors, which consists in passing the liquor at such dilution and rate of flow through a filter containing humus material holding phenol destroying micro-organisms as to maintain an approximate balance between the micro-organic wastage and the micro-organic reproduction in the filter, substantially as described.

9. The process of purifying phenol contaminated liquors, which consists in passing the liquor at such dilution and rate of flow through a filter containing humus material holding phenol destroying micro-organisms as to maintain an approximate balance between the micro-organic wastage and the micro-organic reproduction in the filter, and supplying the oxygen to the filter, substantially as described.

In testimony whereof, I have hereunto set my hand.

RALPH L. BROWN.

Certificate of Correction.

It is hereby certified that in Letters Patent No. 1,437,394, granted December 5, 1922, upon the application of Ralph L. Brown, Pittsburgh, Pennsylvania, for an improvement in "Purification of Phenol-Contaminated Liquors," an error appears in the printed specification requiring correction as follows: Page 2, line 16, for the numeral "29" read *20;* and that the said Letters Patent should be read with this correction therein that the same may conform to the record of the case in the Patent Office.

Signed and sealed this 9th day of January, A. D., 1923.

[SEAL.] KARL FENNING,

*Acting Commissioner of Patents.*